United States Patent
Su

(10) Patent No.: US 6,302,344 B1
(45) Date of Patent: Oct. 16, 2001

(54) LIGHTWEIGHT VIDEO CASSETTE

(76) Inventor: Chen K. Su, 5868 Jameson Dr., Naples, FL (US) 34119

( * ) Notice: Subject to any disclaimer, the term of this patent is extended or adjusted under 35 U.S.C. 154(b) by 0 days.

(21) Appl. No.: 09/345,741

(22) Filed: Jul. 1, 1999

(51) Int. Cl.$^7$ .................................................. G03B 23/02
(52) U.S. Cl. ........................................ 242/347.1; 360/132
(58) Field of Search ................................. 242/347, 347.1, 242/347.2; 360/132

(56) References Cited

U.S. PATENT DOCUMENTS

| | | |
|---|---|---|
| Re. 21,435 | 4/1940 | Scheibell . |
| 1,944,023 | 1/1934 | Ford . |
| 2,466,524 | 4/1949 | Williams . |
| 3,092,346 | 6/1963 | Goodall et al. . |
| 3,208,686 | 9/1965 | Edwards . |
| 3,389,953 | 6/1968 | Gerry . |
| 3,443,501 | 5/1969 | Domnick . |
| 3,479,112 | 11/1969 | Lester . |
| 3,495,787 | 2/1970 | Wallace . |
| 3,641,896 | 2/1972 | Downey . |
| 3,677,497 | 7/1972 | Lowry et al. . |
| 3,722,387 | 3/1973 | Walther . |
| 3,756,707 | 9/1973 | Sharp . |
| 3,785,725 | 1/1974 | Batter . |
| 3,971,071 | 7/1976 | Urayama . |
| 4,226,381 | 10/1980 | Katata . |
| 4,227,622 | 10/1980 | Okamura et al. . |
| 4,235,395 | 11/1980 | Wardenaar et al. . |
| 4,249,710 | 2/1981 | Dobbs et al. . |
| 4,306,690 | 12/1981 | Izaki et al. . |
| 4,341,365 | 7/1982 | Oishi . |
| 4,365,711 * | 12/1982 | Long et al. ........................ 206/387 |
| 4,382,565 | 5/1983 | Shiba . |
| 4,418,373 | 11/1983 | Fujimora et al. . |
| 4,457,473 * | 7/1984 | Mroz et al. ........................ 242/347.2 |
| 4,466,583 | 8/1984 | Giannis et al. . |
| 4,473,194 | 9/1984 | Kashimura . |
| 4,501,396 | 2/1985 | Tomsyck et al. . |
| 4,520,969 | 6/1985 | Wulfing et al. . |
| 4,556,153 | 12/1985 | Takagi et al. . |
| 4,620,255 | 10/1986 | Cook et al. . |
| 4,649,563 | 3/1987 | Tollefson . |
| 4,707,757 | 11/1987 | Shiba et al. . |
| 4,715,558 | 12/1987 | Fair et al. . |

(List continued on next page.)

FOREIGN PATENT DOCUMENTS

| | | | |
|---|---|---|---|
| 28 43 238 | 10/1978 | (DE) . | |
| 2951951 * | 7/1981 | (DE) ................................. | 242/347.2 |
| 2 104 872 | 3/1983 | (GB) . | |
| WO 88/08196 | 10/1988 | (WO) . | |
| WO 91/07752 | 5/1991 | (WO) . | |
| WO 91/09401 | 6/1991 | (WO) . | |

OTHER PUBLICATIONS

Tape/Disc Business, "New One–Piece Videocassette Aimed at Premium Market", Aug. 1991, pp. 12–13.

*Primary Examiner*—Emmanuel M. Marcelo
(74) *Attorney, Agent, or Firm*—Venable; Michael A. Gollin; Catherine M. Voorhees

(57) ABSTRACT

A videotape cassette includes a housing made of plastic, a pair of video tape-holding spools, and a dust cover rotatably attached to said housing at a front portion thereof, where the dust cover is rotatable into an open position when placed in a videotape cassette recorder. The cassette housing is durable and weighs approximately 3.5 ounces or less, and the resultant videotape cassette is compatible with industry standard videocassette recorders. A method of direct mailing a videotape cassette as described above includes the steps of loading on a spool of the videotape cassette a selected content of video, shrink-wrapping the videotape cassette, affixing a mailing label and postage to the shrink-wrapped videotape cassette, and placing the labeled, shrink-wrapped videocassette in the mail for shipment.

17 Claims, 7 Drawing Sheets

U.S. PATENT DOCUMENTS

| | | |
|---|---|---|
| 4,824,044 | 4/1989 | Oogi . |
| 4,932,604 | 6/1990 | Maechara et al. . |
| 4,951,167 | 8/1990 | Hiramoto et al. . |
| 4,969,612 | 11/1990 | Thomas . |
| 5,082,197 * | 1/1992 | Satoh et al. .......................... 242/347 |
| 5,092,536 | 3/1992 | Gelardi et al. . |
| 5,114,092 | 5/1992 | Gelardi et al. . |
| 5,201,476 | 4/1993 | Gelardi et al. . |
| 5,308,015 | 5/1994 | Gelardi et al. . |
| 5,335,876 * | 8/1994 | Yasufuku et al. ................. 242/347.1 |
| 5,377,928 * | 1/1995 | Gelardi et al. ....................... 242/347 |
| 5,390,871 * | 2/1995 | Gelardi et al. .................... 242/347.2 |
| 5,417,379 * | 5/1995 | Gelardi et al. ....................... 242/347 |
| 5,544,834 | 8/1996 | Esguerra et al. ................. 242/347.1 |
| 5,984,222 * | 11/1999 | Sasaki ................................. 242/347 |

* cited by examiner

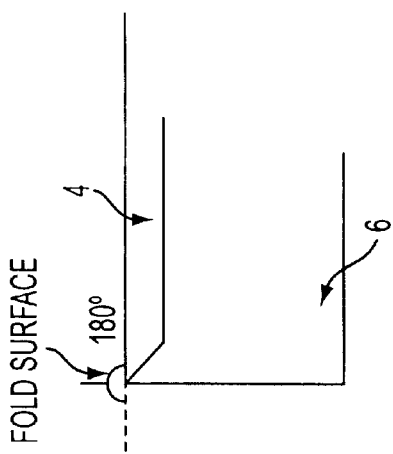
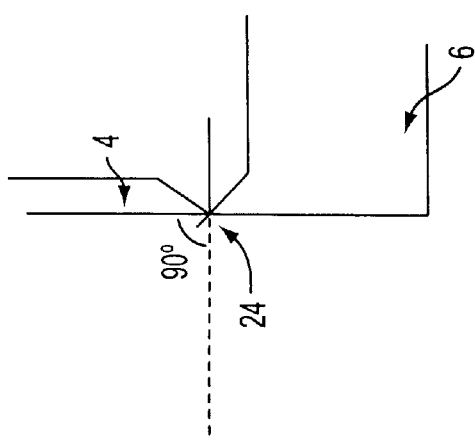
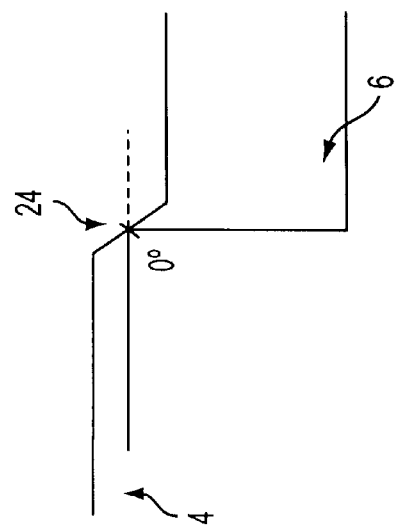
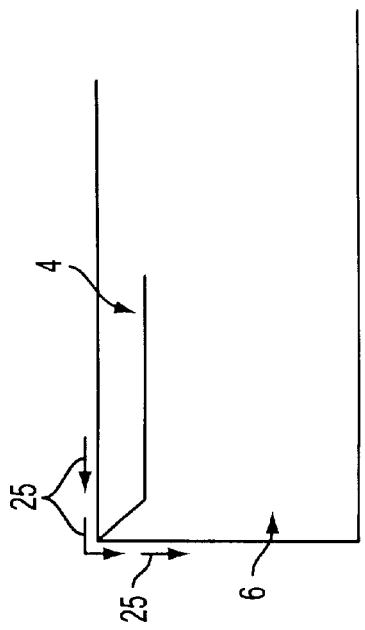
FIG. 3A
FIG. 3B
FIG. 3C
FIG. 3D

LIGHTWEIGHT VIDEO CASSETTE

BACKGROUND OF THE INVENTION

This invention relates to a direct mail videocassette that is lightweight and has a virtually indestructible housing. Specifically, the invention is directed to a videocassette housing made of durable material, such as plastic, and having a limited number of parts while remaining compatible with known videocassette recorders.

The original design and construction of traditional type videocassette housings (e.g., VHS cassettes) has not changed significantly since videocassettes were developed in the 1970's. However, the number of applications for videocassettes has grown significantly during this time. For example, today, a great number of videocassettes are used for direct mail video marketing and promotion of products and services.

In a typical example of existing cassettes, U.S. Pat. No. 4,227,622 to Okamura et al. is directed to a tape cassette housing including an upper half casing and a lower half casing which are screwed together to form the housing. In addition to being time consuming during the production of videocassettes, the use of screws requires a more rigid plastic such as ABS (acrylonitrile-butadiene-styrene terpolymer) or polystyrene (PS). Further, the weight of the tape cassette taught by Okamura et al. is expensive to use in direct mailing. Additionally, the rigid plastic of the housing taught by Okamura et al. can be broken during mailing or shipping and requires protective cushioning if it is to be shipped or mailed without damage. Thus, the videocassette of Okamura et al. needs expensive corrugated cardboard boxes or bubble wrap and cardboard sleeves, and higher postage if employed for direct mail.

Integrally molded cassettes are disclosed in U.S. Pat. Nos. 5,092,536 to Gelardi et al. and 5,544,834 to Esguerra et al. The housing of Esguerra et al. is primarily in two pieces, namely a housing piece and a dust cover. The Gelardi et al. videocassette housing also includes an integral dust cover. However, neither the videocassette taught by Esguerra et al. nor that taught by Gelardi et al. actually work well in videocassette recorders, loaders, and duplication decks, and are not fully VHS compatible.

The videocassette disclosed by Gelardi et al. is suitable only to be used once or twice and then thrown away. The Gelardi et al. videocassette relies on an external dust cover latch that is subject to becoming damaged as the dust cover opens and closes each time the videocassette is engaged with a player/recorder, and lacks sufficient spring force to keep the dust cover closed. Since the dust cover of Gelardi et al. can be easily opened, the videotape, which the dust cover protects, can become damaged.

Neither Gelardi et al. nor Esguerra et al. address the need for a lightweight videocassette or problems associated with direct mailing. Gelardi et al. discusses a need for a cassette housing which is made out of recyclable material and can be produced at a low cost, but, is not concerned with the weight of the cassette. While the Esguerra et al. patent discloses a videotape cassette made of non-brittle material capable of withstanding substantial handling and misuse without breaking, it does not provide a lightweight reliable cassette suitable for direct mail application.

This invention is in a crowded and mature art and succeeds where previous efforts have failed. As stated above, none of the above-identified patents are directed to solving problems associated with direct mailing. Thus, none of the patents are concerned with achieving a lightweight cassette that has a high resistance to impact and is fully operational in known videocassette recorders.

This invention satisfies a void in the videocassette art and the need for an inexpensive, lightweight videocassette that is durable and operational in industry standard players/recorders. Moreover, this invention will revolutionize direct mail marketing and promotions, as expensive, protective packaging is no longer necessary when mailing videocassettes to prospective customers.

SUMMARY OF THE INVENTION

In summary, the videocassette according to the invention is lightweight, preferably 3.3 ounces or less, has a virtually indestructible housing which is made of durable plastic and constructed with a limited number of parts, and is compatible with industry standard video cassette recorders.

It is an object of the invention to provide a videocassette housing that is primarily of one-piece construction with a dust cover where the resultant videotape cassette is lightweight. In order to achieve a lighter cassette, less material is used which reduces the costs associated with the raw material. Preferably, the videocassette according to the invention weighs 3.3 ounces or less so that with a typical five-minute recording, it qualifies for significantly reduced postage rates. A 3.3-ounce cassette qualifies under current USPS standards for automated flat rate processing rather than the automated bulk rate where the cost increases for every tenth of an ounce over 3.3 ounces.

Another object is that the housing and dust cover are made of an impact resistant material so that the resultant, lightweight videocassette can be mailed or handled in shipping without the previously required, outer protective packaging, such as expensive boxes, bubble wrap and/or cardboard sleeves. Because the invention eliminates the need for outer protective packaging intended to protect known cassettes from being crushed and/or the bumps, blows and bangs associated with shipping or handling, lightweight, inexpensive plastic shrink-wrap is all that is needed to mail cassettes according to the invention. As a result, the costs associated with direct mailing the inventive videocassette will be less than previously thought possible.

That is, in addition to the weight eliminated by the previously required protective packaging, the cassette according to the invention eliminates another charge accessed by the United States Postal Service (USPS). Because the cassette according to the invention can be mailed or shipped without the bulky packaging described above, the mailed or shipped cassette had a fixed exterior dimension which avoid the USPS Residual Shape Charge that is required in order to mail or ship existing cassettes.

Yet another object of the invention is that the videocassette housing may be molded in one unit from impact resistant plastic and includes reinforced structures within the housing to strengthen the videocassette when assembled so that the resultant videotape cassette is virtually indestructible under postal conditions despite its lightweight. Such reinforcement eliminates the need for any protective or cushioning packaging and the associated labor costs.

In a preferred embodiment, the cassette weighs less than 4.5 ounces. More preferably, it weighs less than 3.75 ounces. Most preferably, the cassette weighs 3.5 ounces, or, even 3.3 ounces or less.

It is still another object of the invention to provide a videotape cassette with a limited number of moving parts. As a result, there are fewer components to break and fewer components to assemble, resulting in faster production rates and thus, lower assembly costs per cassette.

A further object of the invention is to provide a videocassette with universal spools. That is, the bottoms of the spool hubs have symmetrical (preferably, square or rectangular) teeth to stop spool rotation clockwise and counter-clockwise. Thus, according to the invention, only one type of spool needs to be manufactured as the universal, symmetrical teeth eliminate the requirement of left and right spools. This reduces costs associated with two different types of spools and simplifies production.

Another object of the invention is a separate dust cover lock, which is made of plastic and is designed to lock the videotape cassette dust cover in the closed position. The latch is pivotable so that the dust cover can move into the open position when inserted into an automatic loader or player/recorder. The shape and pivot point of the dust cover latch allows full VHS compatibility with fewer parts than known cassettes with an additional metal spring.

Yet another object of the invention is a method of direct mailing a videotape cassette including the steps of loading on a spool of the videotape cassette a selected content of video, shrink-wrapping the videotape cassette, affixing a mailing label and postage to the shrink-wrapped videotape cassette, and placing the labeled, shrink-wrapped videocassette in the mail for shipment.

The above objects and advantages are obtained by a videotape cassette for use in conjunction with a videotape cassette recorder comprising a housing made of plastic and including a pair of video tape-holding spools, and a dust cover rotatably attached to the housing at a front portion thereof, where the dust cover is rotatable into an open position when placed in a videotape cassette recorder and wherein the cassette is durable and weighs approximately 3.3 to 3.5 ounces. Further, the videotape cassette according to the invention is compatible with industry standard videocassette recorders (e.g, fully VHS compatible).

Further objectives and advantages will become apparent from a consideration of the description and drawings.

BRIEF DESCRIPTION OF THE DRAWINGS

The invention is better understood by reading the following detailed description with reference to the accompanying figures, in which like reference numerals refer to like elements throughout, and in which:

FIGS. 3a–d schematically illustrate the connection of the top panel of the cassette housing to the rear wall of the housing;

FIG. 6c shows a side view of the duct cover latch;

DETAILED DESCRIPTION OF THE PREFERRED EMBODIMENTS

Figure 1:
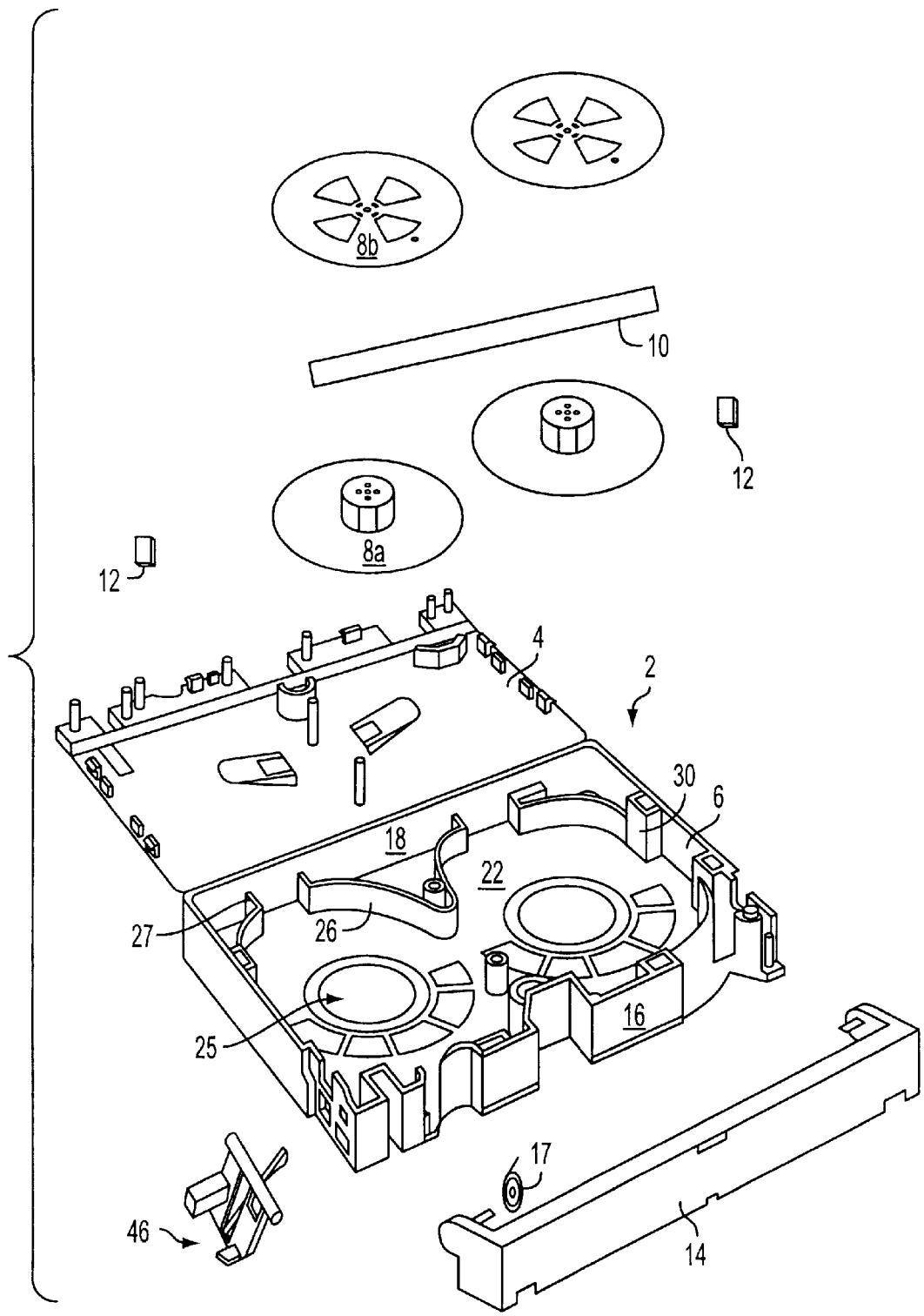
FIG. 1 is an exploded, perspective view of the videotape cassette according to the invention.

In describing preferred embodiments of the present invention illustrated in the drawings, specific terminology is employed for the sake of clarity. However, the invention is not intended to be limited to the specific terminology so selected. It is to be understood that each specific element includes all technical equivalents which operate in a similar manner to accomplish a similar purpose. Each reference cited here is incorporated by reference as if each were individually incorporated by reference. The term "a" is intended to mean at least one unless the context indicates otherwise.

The term "fully VHS compatible" is defined by the specifications listed in JVC (Japanese Victor Corporation) report entitled "Center Report from the VHS Standard Center."

FIG. 1 shows an exploded, perspective view of the videotape cassette according to the invention. The housing 2 is preferably one continuous unit and molded out of a tough, durable polypropylene material, rather than polystyrene which is used in conventional videocassettes. In a preferred embodiment, housing 2 has a top panel 4 and a cassette base 6 that receives spools 8, videotape 10 and rollers 12.

Figure 6A:
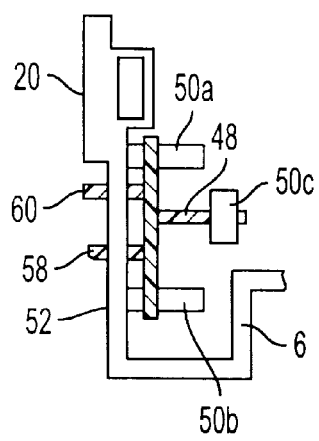
FIGS. 6a–c show the dust cover latch according to the invention, where FIGS. 6a and b show the duct cover latch installed in the cassette housing
Figure 6C:
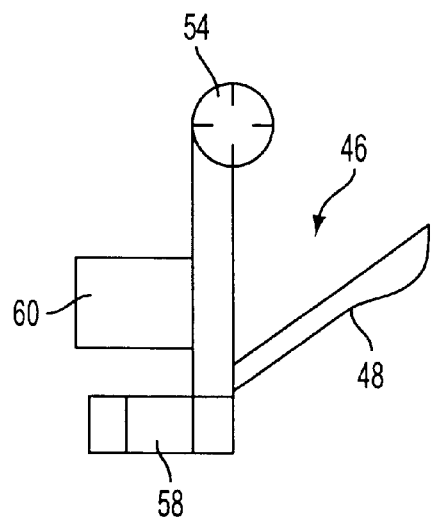
Figure 6B:
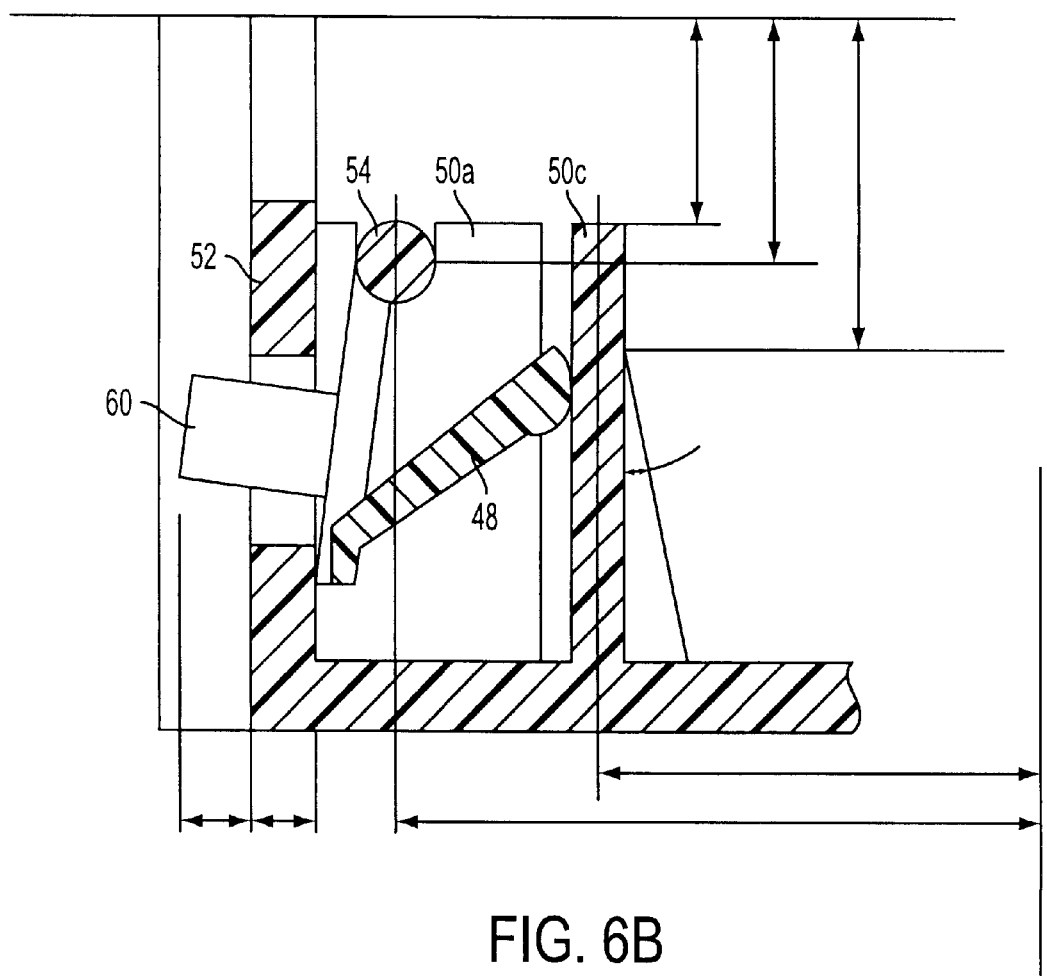

In a preferred embodiment, housing 2 is molded so that a rectangular box with six sides is formed when the housing is assembled. A dust cover 14 is attached to the front wall 16 of cassette base 6 with a spring 17 and a dust cover latch, which will be described below with reference to FIGS. 6a–c is also received in cassette base 6. High impact resistant plastic, such as polypropylene, is used to mold both housing 2 and dust cover 14. Injection molding is a preferred method of producing housing 2 and dust cover 14.

Housing 2 and dust cover 14 make up the outer structure of the videotape cassette and since they are molded from impact resistant plastic, the resultant cassette is virtually indestructible. As a result, protective packaging that cushions a cassette from shipping and handling is no longer necessary.

Cassette base 6 has five sides of the rectangular box: Front wall 16, rear wall 18, side walls 20 and bottom panel 22. Front wall 16, rear wall 18 and side walls 20 are approximately vertical and perpendicular (i.e., 90°) to bottom panel 22. Top panel 4 of housing 2 is connected to the rear wall 18 of cassette base 6 and is folded over cassette base 6 when the cassette is assembled. As schematically shown FIGS. 3a–d, the intersection line 24 of top panel 4 with rear wall 18 is not a square edge and is preferably made of minimum thickness. As a result, less material is needed to mold housing 2 and the weight of housing 2 is reduced.

In order to form intersection line 24, rear wall 18 of cassette base 6 is taller than side walls 20. The upper part of rear wall 18 that extends higher than that of side walls 20 is angled back until a minimum thickness is achieved. This minimum thickness can be as small as 0.25 mm. A 3.5 oz cassette has a typical thickness for outside walls (e.g. 20) and inner radial walls 26 of about 1.6 mm; but these can be reduced to 1.25 mm, thus creating a lighter cassette of 3.3 ounces or less. Likewise, the edge of top panel 4 that intersects with rear wall 18 is angularly reduced. FIG. 3b clearly shows the reduced angled edges of rear wall 18 and top panel 4.

Moreover, the fold at intersection 24 does not behave like a hinge around which top panel 4 would pivot. Due to the minimum thickness of the plastic wall, intersection line 24 that makes up the fold is distorted and stretched. That is, stress from bending is spread out across the reduced angled areas. This distortion and stretching, which results due to the elastic quality of the plastic used, creates a binding force on intersection line 24 as depicted by arrows 25 in FIG. 3d. This binding force reinforces the structure of the assembled housing 2.

Further, because the reduced edges have similar angles that match and the intersection line is not a hinge, top panel 4 is assembled square to the cassette base 6 as no shift occurs when top panel 4 is folded over cassette base 6. The videocassette according to the invention preferably does not employ a molded hinge; but a seam or intersection line 24 of minimum thickness which reduces material costs.

Figure 2:
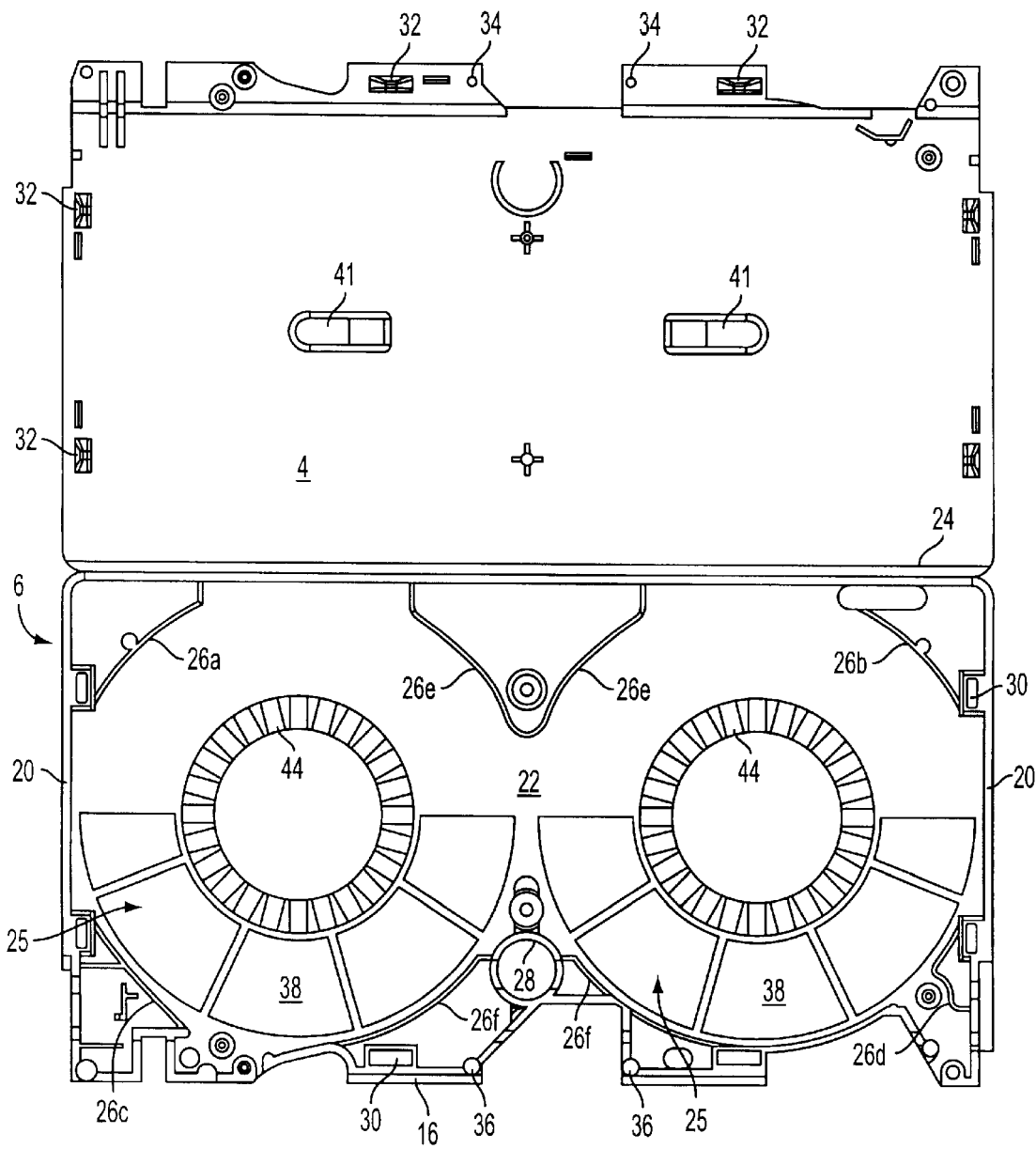
FIG. 2 is a plan view of the housing according to the invention, prior to closing of its top panel and without the videotape spools and dust cover latch.

Looking at FIG. 2, housing 2 has a number of radial walls 26 spanning the perpendicular walls of cassette base 6. Radial walls 26 can define a spool containment area 26 that keeps the spools from jumping out of the containment area. In particular, radial walls 26a and b connect rear wall 18 to respective side walls 20. Likewise, radial walls 26c and d connect front wall 16 with respective side walls 20. The rear center of cassette base 6 has two radial walls 26e, which extend into the base and join together. Similarly, the front center of cassette base 6 has two radial walls 26f, which extend inside the base and join at a circular wall structure 28.

These radial walls 26 permit thinner wall construction than previously thought possible while still providing the impact resistant shell necessary to safely mail a videotape cassette without damage. A preferred thickness of the cassette housing walls is paper thin, approximately 1.25–1.6 mm, which further reduces the weight of the cassette housing. A preferred thickness is 1.4 mm. As described above, the 3.5 oz cassette has typical thicknesses of outside walls (e.g. 20) and inner radial walls 26 of about 1.6 mm, but these can be reduced to 1.25 mm. Rear wall 18 can have additional support structures which extend from the tops of each radial wall 26 to just below the area of the rear wall where the angle reduction begins for intersection line 24. These additional angled support structures 27 strengthen the back of the rear wall 18.

Ribs or support columns 30 are attached to side walls 20 and front wall 16 extending from bottom panel 22 up to the top edge of the side walls or front wall. These ribs further reinforce side walls 20 and permit a reduction in the thickness of the side walls without compromising the impact resistance of the resultant cassette. As a result of the radial walls 26, angled support structures 27 and support columns 30, the wall thickness of housing 2 can be reduced significantly while still maintaining the durability and strength necessary for shipping and mailing without protective cushioning means. Thinner wall thickness in the housing equals less material and a lighter cassette thereby reducing the costs associated with production and mailing of the cassettes.

Support columns 30 are hollow, thus further reducing the weight of the housing. The housing itself weighs approximately 70 grams or 2.47 ounces for a 3.5-ounce cassette. Compression fitted snaps 32 are molded into top panel 4. Snaps 32 are aligned with support columns 30 and fit into the hollow support columns when top panel 4 is folded over cassette base 6. The cassette housing 2 according to the invention includes radial walls 26, support columns 30 and compression fitted snaps 32 which together adds reinforcement to housing 2 thereby allowing thinner walls which translate into less weight and lower postage rates.

The cassette according to the invention uses no screws as the cassette is assembled and held together with snaps 32. Snaps 32 are located around the edge of top panel 4 and lock into channels of support columns 30 molded on front and side walls of the housing 2. Additionally, in a preferred embodiment, the front edge of top panel 4 has posts 34 that are compressed fitted into channels 36 molded on front wall 16. This arrangement of snaps and posts secures the cassette housing closed without the need for screws or other separate fastening means. Thus, this embodiment provides an easier assembly of the cassette and uses less material that results in lower manufacturing costs.

The bottom panel 22 of cassette base 6 can have a semi-circular cutout area 38 as shown in FIG. 2. This reduction in the bottom panel thickness provides a separation in the cassette housing and the bottom of an inserted spool 8. Because all plastics have some electric static character, the rubbing of two large flat surface areas (e.g., the spools and the housing when the spools are rotating) can cause static that will result in a higher drop out per minute in signal quality. The reduction of the bottom panel 22 and the separation of the inserted spool and bottom panel 22 reduce this static. In addition, semi-circular cutout area 38 reduces the amount of material needed for the housing and thus, the cost of manufacturing and mailing the cassette.

Figure 9:
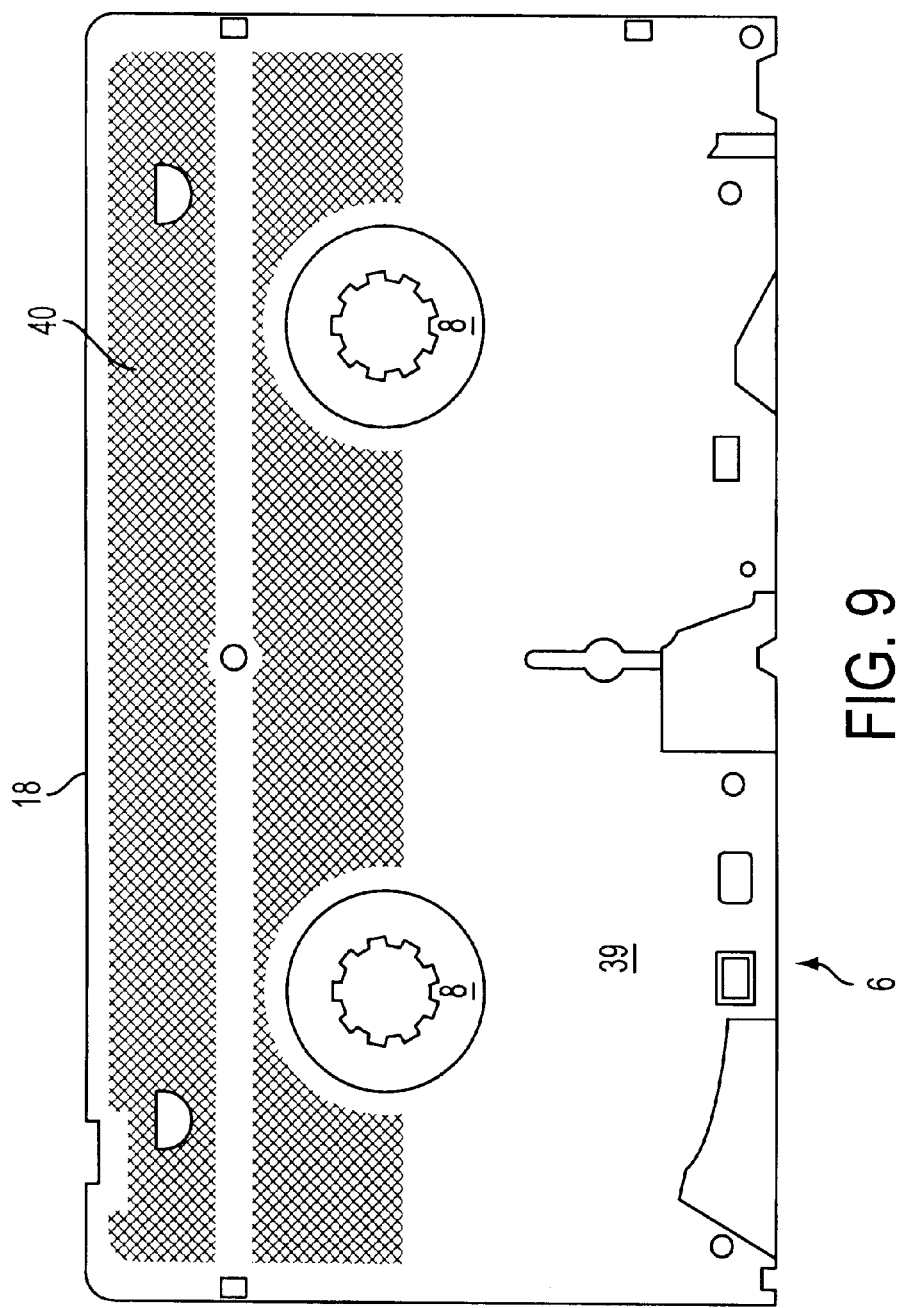
FIG. 9 shows the bottom surface of the cassette housing according to a preferred embodiment of the invention.

In a preferred embodiment, the circular containment area 25 for the spool hubs inside the base of the cassette housing has semi-circular cored-out features 38 that reduce weight, and provide a break in surface area to reduce static that would build up from spools rubbing on the base during fast forward or rewind. On the bottom surface 39 of cassette base 6, opposite to the half of the containment area 25, is a corresponding complementary cored out area 40 (FIG. 9) which allows the cassette to have an overall thickness that is consistent throughout the containment area 25. Consistent wall thickness makes the housing easier to injection mold and produces a stronger housing. The overall appearance of cored-out area 40 is rectangular and spans from rear wall 18 to midway inside the bottom surface 39. Cored-out area 40 may be filled with a number of small protrusions, which provides friction to the otherwise smooth cassette. In another preferred embodiment, top panel 4 may have a similar cored-out area (not shown) located between intersection 24 and below springs 41 (see FIG. 2). Since the top cored-out area is disposed in the resultant interior of the cassette housing, the top of the cassette is smooth for facilitating insertion into a recorder and/or player.

Figure 10:
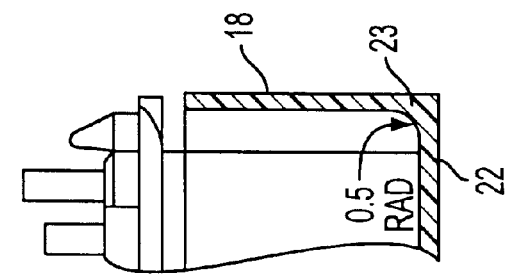
FIG. 10 shows the interior join connection of a side wall to the base of a preferred cassette according to the invention.

The intersection or joints between bottom panel 22 of the cassette base 6 and some or all of the walls (e.g., 16, 18, 20) of cassette base 6 is reinforced in the preferred embodiment by smoothly connecting the internal transitional surface as a radial, circular section 23. The internal transitional surface or circular section 23 is clearly shown in FIG. 10 which is a partial, cross-sectional view of cassette base 6. The preferred dimension of this circular section is 0.5 rad and the same is created during an injection molding of the cassette according to the invention. This shape serves as a reinforcement means because it spreads stress evenly across a wider surface area and also improves the quality of the injection process, providing a stronger housing.

Components inside of the cassette can be made of plastic that is not as durable as polypropylene or other equivalent material. Durability is not as important for the internal parts of the cassette as the housing 2 protects the same. For example, the internal parts can be made of ABS, polystyrene, or polyethlene. Or, the internal parts can be made of polypropylene.

Spools 8 include a hub piece 8a and a flange 8b. Spools 8 are made of plastic which can be polypropylene and polystyrene virgin or reprocessed plastic. Flange 8b is connected to hub piece 8a via compression snaps 40. Thus, no glue or screws are needed to assemble the spools. Spools 8 are of sufficient structure to hold magnetic tape and preferably a length of approximately 4–5 minutes, but may be as long as 10 minutes. The recording tape weighs approximately a tenth of an ounce for 5 minutes of recording.

Figure 4:
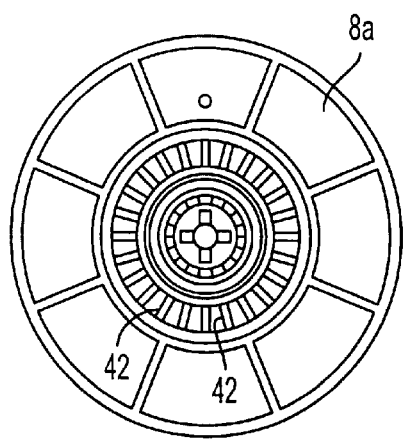
FIG. 4 shows the underneath side of the bottom flange of a spool according to a preferred embodiment of the invention.

As shown in FIGS. 4 and 5, the bottom surface of hub piece 8a is designed with a sufficient number of symmetrical teeth 42 to prevent spool 8 from rotating when the spool is at rest on the bottom of the cassette housing. Symmetrical teeth 42 disposed uniformly around the bottom of hub piece 8a will work on both the left and right spools. That is, symmetrical teeth 42 will stop clockwise and counter-clockwise spool rotation. Accordingly, with the universal symmetrical teeth design, the need for two different spools (left and right spools) is eliminated. This universal design simplifies construction of the videotape cassette.

Figure 5A:
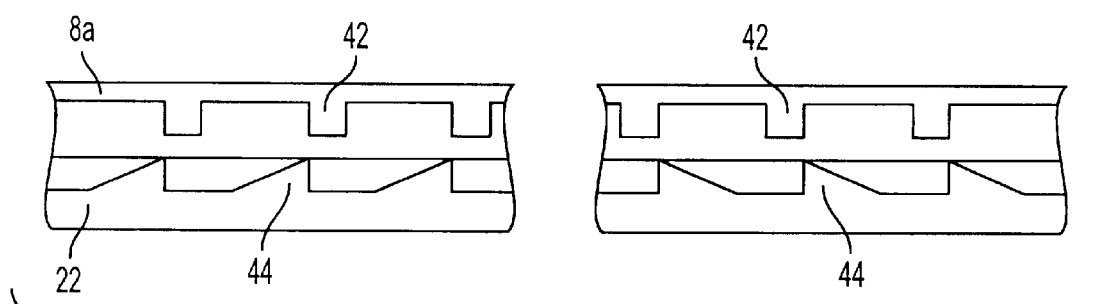
FIGS. 5a and b illustrate the parallel teeth of the spool and its relationship with the cassette housing.
Figure 5B:
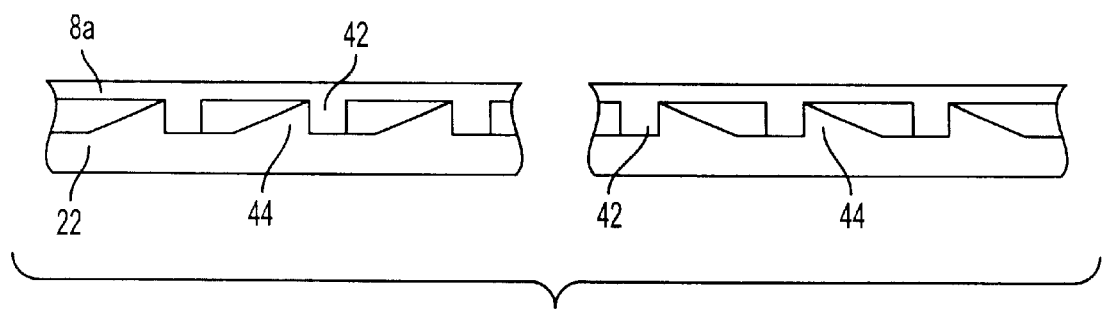

Looking at FIG. 2 and FIGS. 5a and b, bottom panel 22 of cassette base 6 is provided with a sufficient number of gear teeth 44 that are spaced so there is a separation between teeth. FIG. 5a shows a partial sectional view of the hub piece 8a and bottom panel 22 when spools 8 are lifted off the bottom panel and rotated. FIG. 5b, shows the same when spools 8 are at rest. As can be seen from FIG. 5b, when spool 8 is resting, the symmetrical teeth 42 of hub piece 8a catch on gear teeth 44 on bottom panel 22 thereby preventing the spool from rotating. The number of teeth needed is inversely proportional to the tension force applied by springs 41 which engage flanges 8b of the spools when the cassette is assembled. An edge on the symmetrical teeth should be about 0.2–0.3 mm to achieve the necessary interference with gear teeth 44 of bottom panel 22. The interference caused when the symmetrical teeth 42 and gear teeth 44 engage is minimum and sufficient to stop the rotation of a spool.

A dust cover latch 46 is received in housing 2 as will be explained below with reference to FIGS. 6a and b. Dust cover latch 46 is preferably injected molded as a one-piece plastic piece and made from delrin or like plastic that has excellent memory properties. Dust cover latch 46 is designed to lock dust cover 14 in the closed position and has a spring arm 48 that when assembled in housing 2 will provide the necessary tension to keep dust cover latch extended or in the closed position. That is, spring arm 48 is molded to a main piece of dust cover latch 46 so that spring arm 48 provides the necessary tension to keep dust cover 14 in the closed position.

As shown in FIG. 6a which is a top view of the assembled dust cover latch 46, the lower left portion of cassette base 6 extending from side wall 20 is U-shaped. Inside the U-shaped area, three pillars 50a, b and c are disposed which extend from bottom panel 22. Pillars 50a and b extend perpendicularly from side wall 20 into the U-shaped area and have a recess 52 on the top edge of each pillar 50a and b. A cylindrical top 54 of dust cover latch 46 rests in each recess 52 when assembled so that the dust cover latch 46 extends between pillars 50a and b. Thus, dust cover latch 46 is offset from recess 52 and creates a stronger latch and release effect than that of known videotape cassettes.

Spring arm 48 is located so that it pushes against pillar 50c which is parallel to side wall 20. Dust cover latch 46 has two protuberances which extend from one side of the latch through openings in a recessed area 56 of side wall 20. Protuberance 58 is symmetrical or saw-toothed shaped and locks the dust cover 14 closed by engaging a corresponding protuberance on the dust over. A square-shaped protuberance 60 is pressed by a videocassette recorder (VCR) probe when the cassette is inserted into the VCR. The VCR probe pushes back the entire dust cover latch so as to disengage the saw-toothed protuberance 58 and release dust cover 14.

Figure 7:
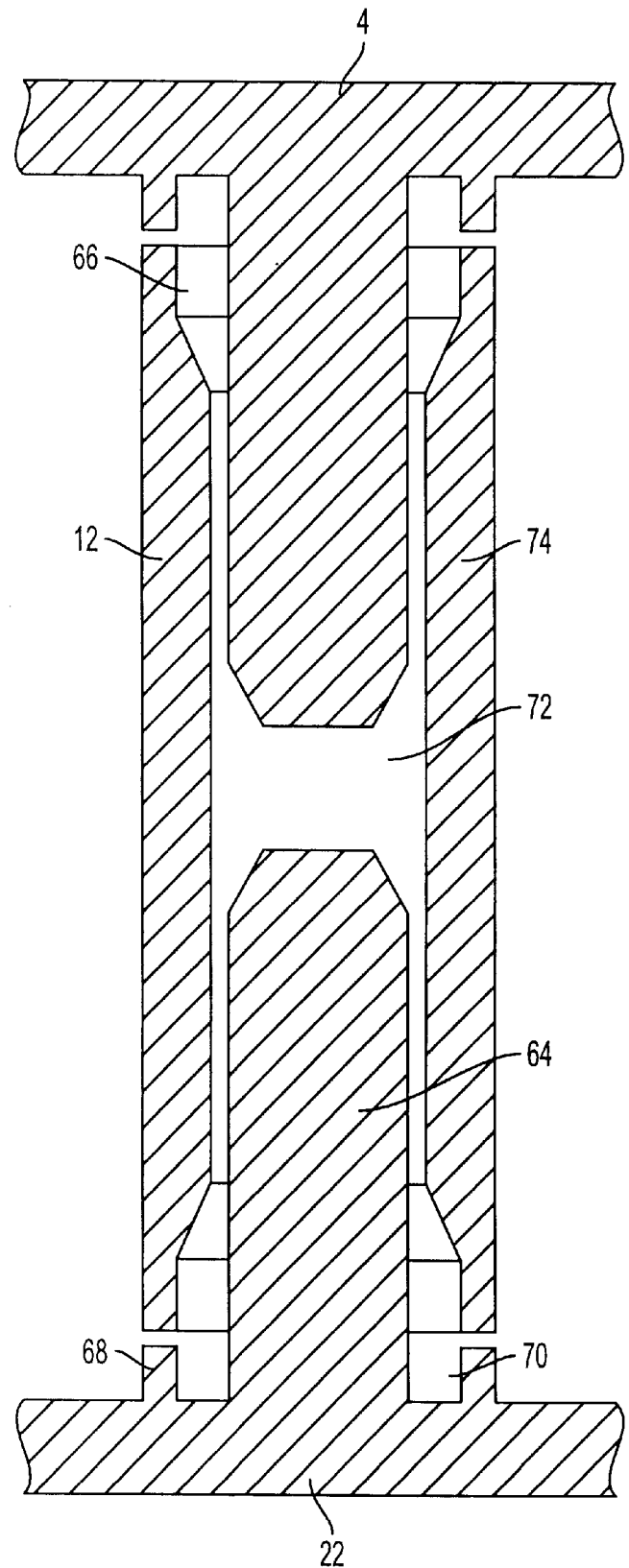
FIG. 7 shows the roller guide post and tape guide roller of a preferred embodiment of the invention.

In a preferred embodiment, rollers 12 are provided around guide posts 64 to facilitate the movement of the videotape 10 when the videotape cassette is being used. The free rolling sleeves can be made from delrin or other plastic which enables the roller to maintain a high polished contact with the videotape. As shown in FIG. 7, each roller 12 has an expanded inner-taper 66 to reduce contact surface with guide post 64. Inner-taper 66 reduces the wear and heat on videotape due, to surface friction. The reduction of heat and friction greatly improves rotation and reduces videotape stretching and dropouts per minute (DPM).

A wear ring 68 is molded around each guide post 64 which additionally results in less surface contact at the base or top of the housing thereby reducing heat, wear and friction on the videotape. A heat dissipation channel 70 is molded at the base of each guide post 64 which further reduces friction and heat by allowing heat to dissipate through channel 70.

Each guide post 64 has a taper 72 at its top which reduces contact surface between rollers 12 and guide posts 64. Each roller 12 has an inner wear ridge 74 that extends from the inner-taper 66 on either side of the roller 12. This inner wear ridge reduces the area of contact between the roller and the guide post thereby improving rotation a ad reducing videotape stretching and DPM. For cassettes that are intended for fewer plays, the rollers may not be necessary.

Figure 8:
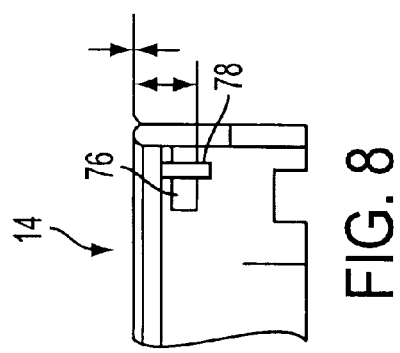
FIG. 8 shows the side of the dust cover with the shaft for holding the spring.

FIG. 8 shows a partial section of dust cover 14 slowing shaft 76 on which spring 17 is attached. Shaft 76 has an outer ring 78 and spring 17 is attached between outer ring 78 and the outside end of shaft 76.

The durable, lightweight videotape cassette according to the invention is suitable for today's direct mail application for videotape cassettes. Due to the tough polypropylene material and its lighter weight, the inventive cassette described above can be used in direct mail shipments without the weight of outer packaging. Typically, a bubble wrap mailer adds 0.9 ounces to the weight and a paperboard sleeve adds 0.7 ounces. With the cassette according to the invention, the direct mail benefit is achieved by loading on a spool of the videotape cassette a selected content of video, shrink-wrapping the videotape cassette, affixing a mailing label and postage to the shrink-wrapped videotape cassette, and placing the labeled, shrink-wrapped videocassette in the mail for shipment. Since the videotape cassette is so lightweight, a response card can be added to the mailing to encourage a receiver's response and still be lighter than conventional videotape cassettes.

Cassettes according to the invention have been made and used in postal conditions successfully. For this embodiment, the average weight of the cassettes is 3.5 oz or less, with a tolerance of $\pm \leq 0.05$ g (0.002 oz.). The cassettes thus qualify for automatic bulk rate postage processing in the USPS. As discussed above, cassettes weighing 3.3 ounces or less would qualify for automatic flat rates in the USPS. The meaning of 3.5 oz according to the invention is that given by the USPS, which weighs a sample number of pieces of a bulk shipment, determines the average weight, rounding up at the second decimal place. Thus, a cassette weighing 3.549 oz would be considered a 3.5 oz cassette, whereas a 3.55 oz cassette would typically not qualify and would be charged for 3.6 ounces as described above.

Tests comparing the durability of the inventive cassette to standard cassettes show the remarkable improvements brought about by the invention. When standard VHS cassettes (e.g. TDK or Sony commercially available models which weigh as much as 5 ounces) are shipped without protective packaging, on receipt, damage is frequently observed. The dust cover typically breaks off, and further damage includes cracks of the polycarbonate windows, cracks in the top surface between the windows, cracked back corners, and cracking or shearing off of the bottom of the cassette outside the hub containment area.

In contrast, in a shipping test, thousands of pieces of the 3.5 oz embodiment of the inventive cassette were mailed to recipients throughout the continental United States and in Canada, and the recipients responded with observations on the condition of the cassette as received. All were received undamaged. Moreover, some recipients placed postage and a return label on the cassette and sent it back to the sender, and all these cassettes survived reshipment intact.

A controlled drop test was conducted. When standard videocassettes are dropped from 3 feet onto concrete, a high percentage suffers damage. When the inventive cassette is dropped, no damage was suffered. The inventive cassettes survive dropping from six feet, twice the normal test height, and thus far exceed industry standards.

A mailbag test was conducted. A large number of videocassettes was placed in a mailbag and subjected to automatic handling by equipment such as that used in US Postal Service facilities. The cassettes survived intact and were undamaged. Absent extraordinary circumstances not typically encountered in shipment (such as a truck driving over a cassette) the inventive cassettes are indestructible, and thus are described here as virtually indestructible.

The weight of the cassettes can be further reduced according to the invention to comply with the 3.3 oz weight category of the USPS (with the meaning as explained above), by reducing the wall thickness of the 3.5 oz embodiment. The 3.5 oz cassette has typical thicknesses of outside walls (e.g. 20) and inner rib walls 26 of about 1.6 mm, but these can be reduced to 1.25 mm, and the top can be cored out as with the bottom piece of the base with reinforcing ribs. In this embodiment, the modifications are calculated to reduce the weight of the cassette to 3.3 oz to qualify for the unitary pricing bulk rate-shipping category of the USPS. This is preferable to the 3.5-oz category, in which the exact bulk rate postage depends on the source and destination of each cassette, as unit pricing is much easier for fulfillment of orders. The 3.3-oz embodiment still satisfies the need for a cassette that can be shipped intact without protective packaging.

While the weight categories discussed here are those currently in force for the US Postal Service, the invention is not intended to be so limited. Similar advantages may be achieved using other bulk mail carrier services, and would apply even if the USPS changes its weight categories.

In summary, the combination of impact resistant plastic used, limited number of moving parts, and construction of the cassette housing with reinforced top/back junctions, bottom/side junctions and cored-out sections with support columns, and reduced wall thickness make the cassette according to the invention lightweight and virtually indestructible.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

What is claimed is:

1. A videotape cassette comprising:

a housing made of plastic and including a pair of video tape-holding spools, said housing having a cassette base with four walls extending therefrom where the cassette base has a bottom panel thickness and cored-out sections of a thickness which is less than the bottom panel thickness; and a dust cover rotatably attached to said housing at a front portion thereof, said dust cover being rotatable into an open position when placed in a videotape cassette recorder wherein said housing is durable enough to survive postal shipment, without damage, without cushioning packaging, said videotape cassette being fully VHS compatible.

2. The videotape cassette of claim 1, wherein said videotape cassette weighs less than 4.5 ounces.

3. The videotape cassette of claim 2, wherein said videotape cassette weighs less than 3.75 ounces.

4. The videotape cassette of claim 3, wherein said videotape cassette weighs less than 3.5 ounces.

5. The videotape cassette of claim 4, wherein said videotape cassette weighs less than 3.3 ounces.

6. The videotape cassette of claim 1, wherein said housing includes reinforced structures that strengthen the walls of the cassette base.

7. The videotape cassette of claim 6, wherein said reinforced structures include radial walls spanning from a rear wall of the cassette base to side walls of the cassette base and spanning from a front wall of the cassette base to the side walls.

8. The videotape cassette of claim 6, wherein said reinforced structures include support columns extending from a bottom surface of the cassette base to an upper edge of the cassette base walls.

9. The videotape cassette of claim 6, wherein said housing is of one-piece construction and further includes a top panel that is connected to a wall of said cassette base and folds over said cassette base to form a cassette.

10. The videotape cassette of claim 9, wherein said top panel and the wall of the base to which the top panel is connected are joined together at an intersection line and no molded hinge is required.

11. The videotape cassette of claim 10, wherein a connecting edge of said top panel and an upper edge of said connecting wall of the cassette base are angularly tapered to form said intersection line, and said top panel is folded over said cassette base so that the angled tapered edges of the top panel and connecting wall meet flush.

12. The video cassette of claim 1, further comprising a dust cover latch which is molded as a separate piece from said housing and wherein said housing has a recessed area on a side of the housing, said dust cover latch being received in said housing so that said latch extends through openings in the recessed area.

13. The videotape cassette of claim 1, wherein the cassette comprises rollers mounted on videotape guideposts.

14. The videotape cassette of claim 1, wherein said videotape cassette has a fixed exterior dimension when mailed.

15. A videotape cassette comprising:
- a housing made of plastic and including a pair of video tape-holding spools; and
- a dust cover rotatably attached to said housing at a front portion thereof, said dust cover being rotatable into an open position when placed in a videotape cassette recorder;

wherein said video tape-holding spools have a bottom surface and said housing has a cassette base, said bottom surface of the video tape-holding spools has a number of symmetrical teeth and a bottom panel of the cassette base has a number of gear teeth where said symmetrical teeth of the bottom surface of the video tape-holding spools and the gear teeth of bottom panel of the cassette base interact and wherein said housing is durable enough to survive postal shipment, without damage, without cushioning packaging, said videotape cassette being fully VHS compatible.

16. The videotape cassette of claim 15, wherein two spools are used in said video tape cassette, both spools having symmetrical teeth so that only one type of spool is necessary.

17. A videotape cassette comprising:
- a housing made of plastic, said housing having a cassette base with five walls and a top panel cover;
- two universal, video tape-holding spools having symmetrical teeth, said spools being disposed in said housing;
- a dust cover rotatably attached to said housing at a front portion thereof; and
- a separately molded dust cover latch disposed in the housing for interaction with said dust cover and for keeping said dust cover in a closed position when not in use.

* * * * *